United States Patent [19]

Köhler

[11] Patent Number: 4,621,998
[45] Date of Patent: Nov. 11, 1986

[54] PRESS FOR CONTINUOUSLY PRODUCING BAND-LIKE ARTICLES

[75] Inventor: Josef Köhler, Northeim, Fed. Rep. of Germany

[73] Assignee: Continental Gummi-Werke Aktiengesellschaft, Hanover, Fed. Rep. of Germany

[21] Appl. No.: 762,704

[22] Filed: Aug. 5, 1985

[30] Foreign Application Priority Data

Aug. 6, 1984 [DE] Fed. Rep. of Germany ....... 3428936

[51] Int. Cl.$^4$ .................... B30B 5/06; B29D 7/14; B29J 5/00
[52] U.S. Cl. ................................... 425/329; 425/371
[58] Field of Search .................. 425/329, 331, 371

[56] References Cited

U.S. PATENT DOCUMENTS

| 1,465,326 | 8/1923 | Zimmer | 425/371 X |
| 2,509,354 | 5/1950 | Jones et al. | 425/329 |
| 2,670,515 | 3/1954 | Wigley | 425/329 |
| 2,817,875 | 12/1957 | Harris et al. | 425/329 X |
| 2,958,096 | 11/1960 | Hunt et al. | 425/371 X |
| 3,881,852 | 5/1975 | Ahrweiler | 425/371 X |
| 3,907,473 | 9/1975 | de Mets | 425/371 X |
| 4,107,387 | 8/1978 | Ahrweiler | 425/371 X |
| 4,213,748 | 7/1980 | Ahrweiler | 425/371 |
| 4,375,350 | 3/1983 | Soto | 425/371 |
| 4,514,162 | 4/1985 | Schulz | 425/329 X |

Primary Examiner—J. Howard Flint, Jr.
Attorney, Agent, or Firm—Becker & Becker, Inc.

[57] ABSTRACT

A continuously-operating vulcanizing press, in which the article which travels through the press is guided on both sides between flexible enclosing strips which travel along with the article. A pressure mechanism, which acts upon the enclosing strips, is provided in the entry region of the press in order to already produce direct contact of the strips with the side edges of the pressed article in the starting phase of the vulcanization. In contrast to the heretofore known arrangement, which is disposed at a distance ahead of the press, the inventive arrangement provides a considerably more precise guidance of the enclosing strips, and hence also provides a qualitative improvement of the end product.

4 Claims, 2 Drawing Figures

PRESS FOR CONTINUOUSLY PRODUCING BAND-LIKE ARTICLES

BACKGROUND OF THE INVENTION

The present invention relates to a press for continuously producing a band-like article, such as a conveyor belt, a wood-chip board, etc.; the press includes circulating, endless molding or curing bands which sandwich the pressed article between them, and which can be adjusted relative to one another via the pressure effect of roller bodies; the press also includes flexible enclosing strips which are disposed on both sides of the article, are in direct contact with the side edges of the latter, and move along with the article.

The following enclosing strips, which are used in rotary drum and also in continuous plate presses, delimit the width of the available press space in conformity to the width dimensions of the pressed article, which changes from case to case; as a result, the enclosing strips result in straight and sharp-edged side surfaces. The flexible enclosing strips, which are generally comprised of multi-layered, rubberized plies, are customarily unwound from stationary rolls and, without being driven, are drawn into the press along with the article which is to be pressed or cured. The precise distance between the enclosing strips is adjusted and determined ahead of time in special guide devices disposed ahead of the press.

It is an object of the present invention, by means of a novel guidance of the enclosing strips, to reliably preclude errors in alignment of the strips relative to one another, and to even preclude slight deviations of the strips from their linear travel within the press space, with the end effect being to guarantee a precisely formed, improved working product of high uniformity.

BRIEF DESCRIPTION OF THE DRAWING

This object, and other objects and advantages of the present invention, will appear more clearly from the following specification in conjunction with the schematically and simply illustrated drawing, in which.

SUMMARY OF THE INVENTION

Figure 1:
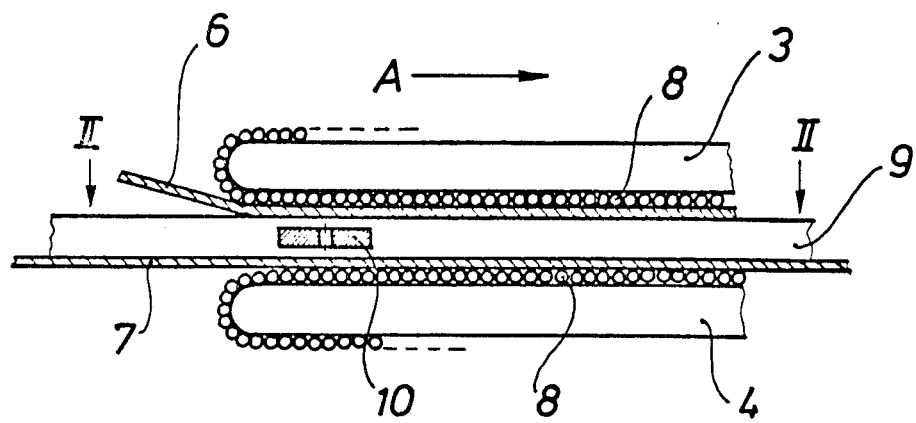
FIG. 1 is a partial longitudinal section through the inlet region of on inventive embodiment of the press.

The press of the present invention is characterized primarily in that pressure members are disposed in the entry region of the press between the molding or curing bands, and under the effect of force, and at right angles to the direction of travel, are adapted to be pressed from the outside against the outer side surfaces of the enclosing strips. The pressure members are advantageously arranged in pairs, at a distance from one another, on both sides of the press. Puruant to a further specific feature of the present invention, the pressure members are expediently in the form of rotatable pressure rollers which roll on the enclosing strips, and are mounted on adjusting members, for example the free end of the piston rods of hydraulic or pressure medium working cylinders, with the piston rods being adapted to be extended at right angles to the direction of travel of the press.

In order to simplify construction, and also with regard to reliability of operation, it previously seemed obvious to dispose the guide mechanism for the enclosing strips externally of the actual press space, and at a certain distance ahead of it, so that there would be no disadvantageous consequences in the free transition space between the finally aligned strips and the inlet to the press. Nonetheless, even though the novel arrangement and construction of the strip-guiding mechanism appears to contradict all logical technical reasoning, the novel arrangement has surprisingly favorable results, namely a considerably more precise setting of the dimensions, and a good quality, which remains uniform over great finishing lengths, of the otherwise continuously critical side edges of the pressed article. The reason for this is probably the placement of the last direction-determining mechanism for the strips in the press space already in the working region of the molding or curing bands, so that any free travel of the strips is eliminated. The enclosing strips undergo their final orientation under the conditions of an already existing positive contact between the molding or curing bands; this so to speak conserves the eliminated directional momentum, and precludes any risk of a possible deflection from the proper position due to uncontrolled vibrations or other external impacts.

DESCRIPTION OF PREFERRED EMBODIMENTS

Referring now to the drawing in detail, the illustrated press, which serves, for example, for the production of conveyor belts, is symbolized by the illustration of the press plates 3, 4, which can be heated. The unfinished or uncured belt 5 is pulled at constant velocity, in the direction of the arrow A, through the press space formed between the plates 3 and 4. The velocity of travel is coordinated to the length of the plates in such a way that the elastomeric material of the belt is reliably and completely vulcanized or polymerized at the outlet of the press. In order to be able to exert the required pressure effect upon the unfinished belt 5, the two press plates 3, 4 can be adjusted relative to one another in a known manner, for example by supporting the lower plate 4 on non-illustrated lifting cylinders. The relative movement between the plates and the unfinished belt is compensated for by steel molding or curing bands 6, 7 which travel along with the unfinished belt; the bands 6, 7 are supported against the press plates 3, 4 via the interposition of roller chains 8. The sides of the press space are delimited by flexible enclosing strips 9 which also travel along with the unfinished belt 5. Various designs of presses of this general type are known.

Figure 2:
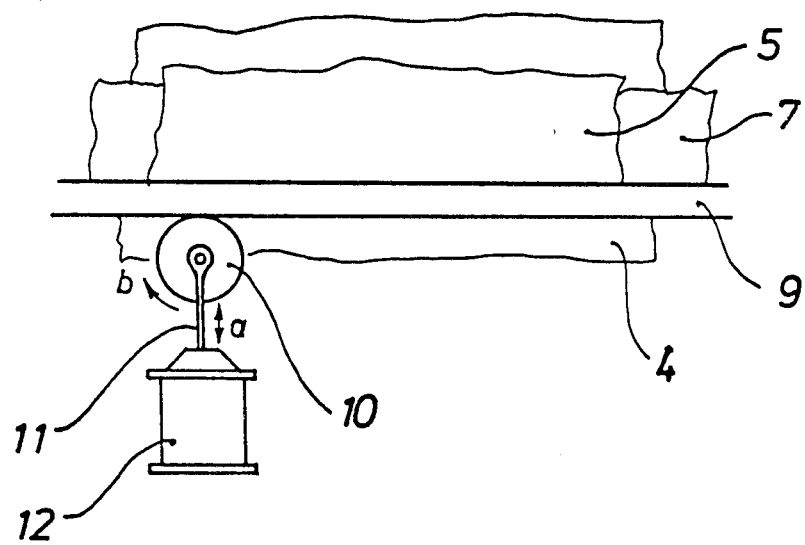
FIG. 2 is a partial plan view of the press taken along the line II—II in FIG. 1.

Pursuant to the present invention, a pressure mechanism which acts upon the enclosing strips 9 is provided in the entry region of the press; this mechanism is in the form of a pressure roller 10 which is rotatably mounted on the piston rod 11 of a working cylinder 12. FIG. 2 is only a partial illustration, and a complete plan view of the press of FIG. 1 which show a similar pressure roller 10 on the opposite side in conjunction with the enclosing strip 9 which is associated with the other edge of the belt. By retracting and extending the piston rod 11 in the direction of the double arrow "a", the two pressure rollers 10 can be adjusted relative to one another and relative to the enclosing strips 9. In the illustrated working state, the rollers 10 rest against the strips 9 with a selectable contact pressure, and, as the unfinished belt 5 which is sandwiched and guided in this manner as it travels through the press, the rollers 10 roll upon the surfaces of the enclosing strips 9 in the direction of rotation indicated by the arrow "b".

The present invention is, of course, in no way restricted to the specific disclosure of the specification and drawing, but also encompasses any modifications within the scope of the appended claims.

What I claim is:

1. A press for continuously producing a band-like article, said press including circulating, endless molding or curing bands which sandwich the article between them, and which can be adjusted relative to one another via the pressure effect of roller bodies; said press also includes flexible enclosing strips which are disposed on both sides of said article, are in direct contact with the side edges of the latter, and move along with said article; the improvement comprises:

pressure members disposed in the entry region of said press between said molding or curing bands and in contact with the outer surfaces of said enclosing strips; under the effect of force, and at right angles to the direction of travel of said article through said press, means for causing said pressure members to be pressed from the outside against those outer side surfaces of said enclosing strips remote from said article.

2. A press according to claim 1, in which said pressure members are provided in pairs, at a distance from one another, on both sides of said press.

3. A press according to claim 2, in which each of said pressure members is a pressure roller which rolls on one of said enclosing strips; and which includes adjustment members, with each of said pressure rollers being rotatably mounted on a respective one of said adjustment members.

4. A press according to claim 3, in which each of said adjustment members comprises a pressure-medium working cylinder with a piston rod which can be retracted and extended at right angles to the direction of travel of said article through said press; a given one of said pressure rollers is rotatably mounted on said piston rod.

* * * * *